(12) United States Patent
Endo et al.

(10) Patent No.: US 7,725,222 B2
(45) Date of Patent: May 25, 2010

(54) CONTROL DEVICE AND CONTROL METHOD OF HYBRID VEHICLE

(75) Inventors: Hiroatsu Endo, Nagoya (JP); Kazuo Kawaguchi, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 799 days.

(21) Appl. No.: 11/653,836

(22) Filed: Jan. 17, 2007

(65) Prior Publication Data

US 2007/0175679 A1 Aug. 2, 2007

(30) Foreign Application Priority Data

Jan. 31, 2006 (JP) .............................. 2006-023634

(51) Int. Cl.
*B60L 9/00* (2006.01)
*B60L 11/00* (2006.01)

(52) U.S. Cl. .................... 701/22; 475/159; 475/116; 475/127; 180/65.21; 180/65.225; 180/65.23; 180/68.285

(58) Field of Classification Search ............. 701/22; 180/65.1, 68.285; 318/139; 475/159, 116; 903/915, 917; 477/125

See application file for complete search history.

(56) References Cited

U.S. PATENT DOCUMENTS

| 6,647,326 B2 * | 11/2003 | Nakamori et al. | 701/22 |
| 7,165,638 B2 * | 1/2007 | Ito et al. | 180/65.23 |
| 7,578,765 B2 * | 8/2009 | Tabata et al. | 477/5 |
| 7,585,242 B2 * | 9/2009 | Endo | 475/117 |

(Continued)

FOREIGN PATENT DOCUMENTS

DE 10 2005 001 715 A1 8/2005

(Continued)

OTHER PUBLICATIONS

Investigation to simulation of control strategy of parallel hydraulic hybrid vehicles based on backward modeling; Liu Tao; Sun Hui; Jiang Jihai; Mechatronics and Automation, 2009. ICMA 2009. International Conference on; Aug. 9-12, 2009 pp. 551-556; Digital Object Identifier 10.1109/ICMA.2009.5246640.*

(Continued)

*Primary Examiner*—Cuong H Nguyen
(74) *Attorney, Agent, or Firm*—Oliff & Berridge, PLC

(57) ABSTRACT

A control device of a hybrid vehicle including a motive power distribution mechanism that distributes output of an engine to a first motor-generator and to an output shaft, a second motor-generator that outputs power to the output shaft via a stepped type transmission, and an electricity storage device, and a control method. In an activating operation of the vehicle, a friction engagement device is engaged, and a ready-to-run state is set based on the engagement oil pressure of the friction engagement device detected. It is determined whether the vehicle is in a motor or a non-motor run region. If the vehicle is in the non-motor run region, the original pressure of the friction engagement device is set at a non-working pressure at which a hydraulic switch does not operate, as the engine is started up. After complete explosion of the engine, the original pressure is set at a working pressure at which the switch operates.

13 Claims, 9 Drawing Sheets

U.S. PATENT DOCUMENTS

| | | | |
|---|---|---|---|
| 2007/0162210 A1* | 7/2007 | Kitaori et al. | 701/51 |
| 2007/0173373 A1* | 7/2007 | Kinugasa et al. | 477/3 |
| 2007/0175679 A1* | 8/2007 | Endo et al. | 180/65.2 |
| 2007/0179004 A1* | 8/2007 | Endo | 475/116 |
| 2007/0197336 A1* | 8/2007 | Tabata et al. | 475/150 |
| 2008/0207375 A1* | 8/2008 | Shimizu et al. | 475/127 |
| 2008/0254934 A1* | 10/2008 | Kumazaki et al. | 477/3 |
| 2009/0023548 A1* | 1/2009 | Imamura et al. | 477/3 |
| 2009/0088291 A1* | 4/2009 | Kumazaki et al. | 477/35 |
| 2009/0107136 A1* | 4/2009 | Gierer et al. | 60/459 |
| 2009/0134820 A1* | 5/2009 | Sugiyama et al. | 318/66 |
| 2009/0264231 A1* | 10/2009 | Ogata et al. | 474/11 |
| 2010/0004089 A1* | 1/2010 | Iwase et al. | 477/3 |

FOREIGN PATENT DOCUMENTS

| | | |
|---|---|---|
| EP | 1 074 417 A2 | 2/2001 |
| EP | 1 090 792 A2 | 4/2001 |
| EP | 1 481 832 A2 | 12/2004 |
| JP | 61-250423 * | 10/1986 |
| JP | A-2003-129880 | 5/2003 |
| JP | P 2005-336782 * | 3/2005 |
| JP | A-2005-206021 | 8/2005 |
| JP | P 2005-336782 * | 11/2005 |
| JP | A 2005-329787 | 12/2005 |
| JP | 2006-022252 * | 1/2006 |
| JP | 2006-023633 * | 1/2006 |

OTHER PUBLICATIONS

Factors influencing the system efficiency of hydrostatic transmission hybrid vehicles; Sun Hui; Jiang Ji-hai; Wang Xin; Vehicle Power and Propulsion Conference, 2008. VPPC '08. IEEE; Sep. 3-5, 2008 pp. 1-6; Digital Object Identifier 10.1109/VPPC.2008.4677451.*

Control Allocation based Electronic Stability Control System for a Conventional Road Vehicle; Laine, L.; Andreasson, J.; Intelligent Transportation Systems Conference, 2007. ITSC 2007. IEEE; Sep. 30, 2007-Oct. 3, 2007 pp. 514-521 Digital Object Identifier 10.1109/ITSC.2007.4357632.*

Design and Optimization of Single-Phase Liquid Cooled Microchannel Heat Sink; Biswal, L.; Chakraborty, S.; Som, S.K.; Components and Packaging Technologies, IEEE Transactions on; vol. 32, Issue 4, Dec. 2009 pp. 876-886 Digital Object Identifier 10.1109/TCAPT.2009.2025598.*

Effect of pump selection on fuel economy in a dual clutch transmission vehicle; Ahlawat, R.; Fathy, H.K.; Chengyun Guo; Byungchan Lee; Stein, J.L.; Jung, D.; American Control Conference, 2009. ACC '09; Jun. 10-12, 2009 pp. 1371-1378 Digital Object Identifier 10.1109/ACC.2009.5160309.*

Nov. 27, 2009 Office Action issued in German Patent Application No. 10 2007 003 814.5-51 (with English translation).

* cited by examiner

|  | SLB1 | SLB2 | B1 | B2 |
|---|---|---|---|---|
| LOW SPEED STEP L (FIRST SPEED) | ○ | ○ | × | ○ |
| HIGH SPEED STEP H (SECOND SPEED) | × | × | ○ | × |

| | LINE PRESSURE COMMAND | SW1 | SW2 | SW3 |
|---|---|---|---|---|
| LOW SPEED STEP L (FIRST SPEED) | HIGH PRESSURE | OFF | ON | ON |
| | LOW PRESSURE | OFF | OFF | OFF |
| HIGH SPEED STEP H (SECOND SPEED) | HIGH PRESSURE | ON | OFF | ON |
| | LOW PRESSURE | OFF | OFF | OFF |

CONTROL DEVICE AND CONTROL METHOD OF HYBRID VEHICLE

INCORPORATION BY REFERENCE

The disclosure of Japanese Patent Applications No. 2006-023634 filed on Jan. 31, 2006, including the specification, drawings and abstract is incorporated herein by reference in its entirety.

BACKGROUND OF THE INVENTION

1. Field of the Invention

The invention relates to a control device and a control method of a hybrid vehicle and, more particularly, to a technology that remedies the time delay from the activating operation until the vehicle becomes ready to run.

2. Description of the Related Art

There is a known type of hybrid vehicle equipped with a motive power distribution mechanism that distributes the output of an engine to a first motor-generator and to a driving wheel-side output shaft, and a second motor-generator that outputs power to the driving wheel-side output shaft via a stepped type transmission.

In the case where the engine is to be cranked by using the first motor-generator in a hybrid vehicle as described above, there is a need to cause the second motor-generator to generate reaction force. Therefore, prior to the cranking, the stepped type transmission is put into a power transmission-ready state by operating an electric hydraulic pump so as to supply a line pressure that serves as an original pressure of the hydraulic type friction engagement devices of the stepped type transmission. This operation is performed by, for example, a control device of a hybrid vehicle described in Japanese Patent Application Publication No. JP-A-2005-329787.

Ordinarily in the above-described hybrid vehicle, prior to the running of the vehicle, an activating operation of a hybrid control system is performed through a certain operation, for example, by operating an activation button while operating the brake after inserting the key into the slot. Then, the operation of hydraulic pumps, the operation of shift control valves, the operation of the hydraulic type friction engagement devices of the stepped type transmission, etc., are confirmed via hydraulic switches that detect the engagement oil pressure of the hydraulic type friction engagement devices. On the condition that the hydraulic switches have operated, a ready-to-run (RDY-ON) state is set. After the ready-to-run state is set, the vehicle is run by operating the shift lever to a run position and operating the accelerator pedal.

During the activating period following the activating operation, a procedure of confirming the operation of each of hydraulic switches by operating the individual hydraulic pumps sequentially so as to raise the line pressure from the non-working pressure of the hydraulic switch is performed in order to confirm the operation of each of the hydraulic pumps. However, due to the pulsation of the working oil pressure output from a hydraulic pump, the hydraulic switch may sometimes undergo a so-called hunting phenomenon in which the switch repeatedly turns on and off even though the oil pressure is relatively low, that is, at a non-working pressure level of the hydraulic sensor, if the pulsation of the working oil pressure exceeds a predetermined frequency.

During the activating period following the activating operation, when the engine is started up to operate the hydraulic pumps that are driven by the engine and simultaneously an oil pressure command regarding the line pressure is switched from the low pressure side to the high pressure side and the rise of the line pressure to the high pressure side is to be confirmed by the operation of the hydraulic switch, the malfunction by the hunting of the hydraulic switch can occur. Hence, the line pressure is held high for a certain period, and after a predetermined period elapses, a low pressure command is output for a predetermined period followed by the output of a high pressure command. After the operation of the hydraulic switch corresponding to the output of the high pressure command is confirmed, the ready-to-run state is set. Thus, there occurs a drawback of a prolonged time from the activating operation to the setting of the ready-to-run state, that is, a prolonged activating period following the activating operation. This drawback becomes more remarkable in the case where the engine rotation speed is made high, for example, at the time of fast idle rotation during the time of low temperature, or the like.

SUMMARY OF THE INVENTION

The invention has been accomplished against the background of the aforementioned circumstances, and provides a control device and a control method of a hybrid vehicle in which the activating period following the activating operation that includes operation of the engine does not become long.

Accordingly, there is provided a control device of a hybrid vehicle including a motive power distribution mechanism that distributes an output of an engine to a first motor-generator and to an output shaft at a driving wheel side, a second motor-generator that outputs a power to the output shaft via a stepped type transmission, and an electricity storage device. This control device includes the following devices and the like: a startup-time control device that, in response to an activating operation of the hybrid vehicle, engages a hydraulic type friction engagement device provided in the stepped type transmission and sets a ready-to-run state based on a predetermined pressure of the hydraulic type friction engagement device; a hydraulic pump that is rotationally driven by the engine to feed a working oil; and a run region determination device that determines whether the hybrid vehicle is in a motor run region or a non-motor run region. In this control device, if the run region determination device determines that the hybrid vehicle is in the non-motor run region, the startup-time control device sets an original pressure of the hydraulic type friction engagement device at a first predetermined pressure as the engine is started up, and sets the original pressure at a second predetermined pressure after the engine undergoes a complete explosion.

According to another aspect of the invention, there is provided a control method of a hybrid vehicle including a motive power distribution mechanism that distributes an output of an engine to a first motor-generator and to an output shaft at a driving wheel side, a second motor-generator that outputs a power to the output shaft via a stepped type transmission, and an electricity storage device. This control method include the following steps: engaging a hydraulic type friction engagement device provided in the stepped type transmission, in response to an activating operation of the hybrid vehicle, and setting a ready-to-run state based on a predetermined pressure of the hydraulic type friction engagement device; determining whether the hybrid vehicle is in a motor run region or a non-motor run region; and setting an original pressure of the hydraulic type friction engagement device at a first predetermined pressure as the engine is started up, and setting the original pressure at a second predetermined pressure after the engine undergoes a complete explosion, if it is determined that the hybrid vehicle is in the non-motor run region.

According to the control device and the control method of the hybrid vehicle described above, if it is determined that the hybrid vehicle is in the non-motor run region, the original pressure of the hydraulic type friction engagement device is set at the first predetermined pressure as the engine is started up, and then the original pressure is set at the second predetermined pressure after the engine undergoes the complete explosion. Therefore, during the activating period following the activating operation, the engine is started up, so that the mechanical type hydraulic pump driven by the engine is operated and, simultaneously, the oil pressure command regarding the original pressure is switched from the low pressure side to the high pressure side. When the rise of the original pressure to the high pressure side is to be confirmed by the operation of the hydraulic switch, the low pressure command regarding the original pressure is preferentially output. After a predetermined period, the high pressure command is output. After the operation of the hydraulic switch corresponding to the output of the high pressure command is confirmed, the ready-to-run state is set. Hence, the time from the activating operation to the setting of the ready-to-run state, that is, the activating period following the activating operation of the hybrid vehicle, is stably shortened.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

Figure 1:
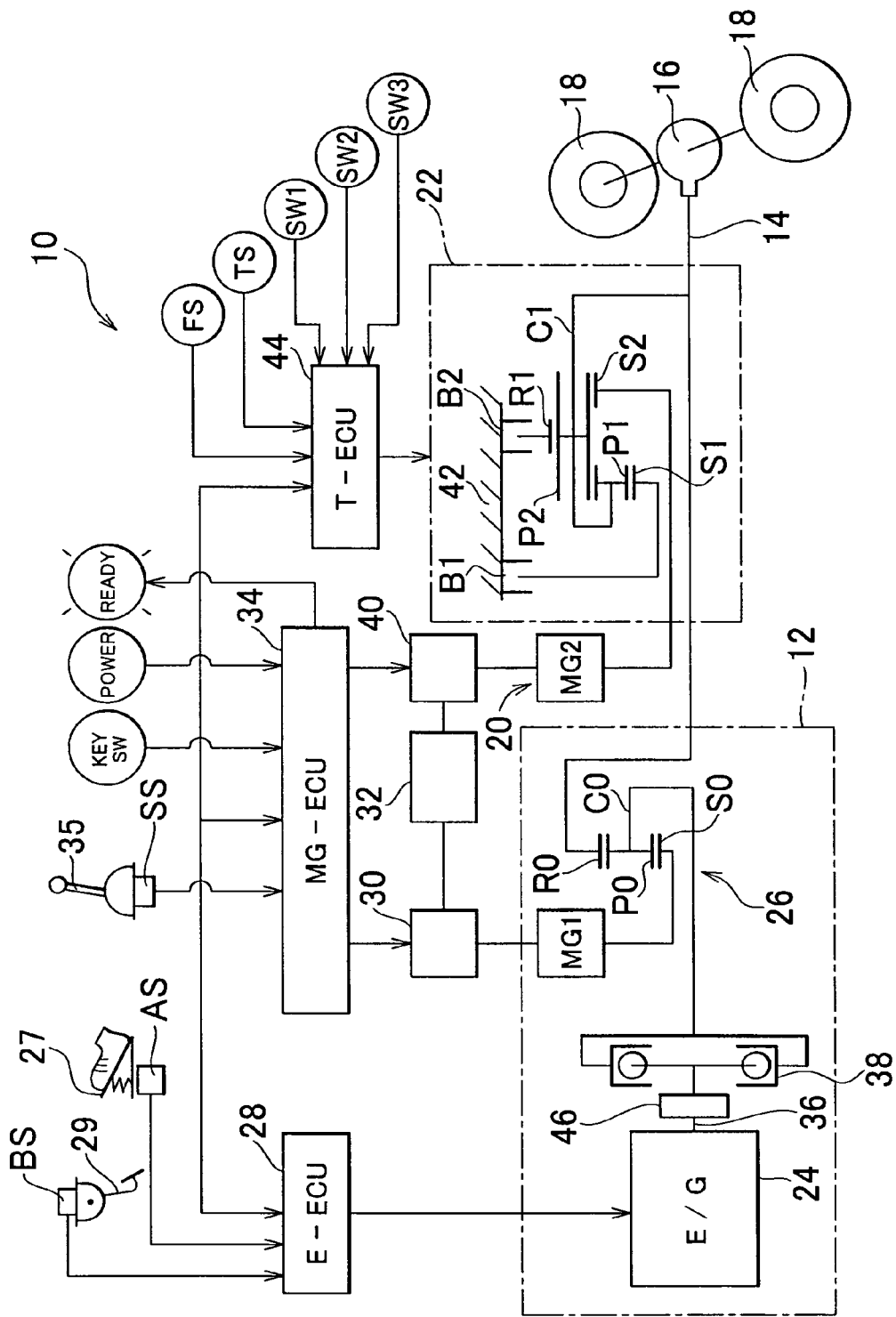
FIG. 1 is a diagram illustrating a drive device and a control device of a hybrid vehicle as an embodiment of the invention.

In the following description and the accompanying drawings, the present invention will be described in more detail with reference to exemplary embodiments. FIG. 1 is a diagram illustrating a drive device and a control device of a hybrid vehicle 10 as a first embodiment of the invention. Referring to FIG. 1, in the hybrid vehicle 10, torque of a first drive source 12 that is a main drive source is transmitted to an output shaft 14 that functions as an output member, and the torque is transmitted from the output shaft 14 to a pair of left and right driving wheels 18 that are front wheels or rear wheels via a differential gear device 16 in a vehicle. Besides, in the hybrid vehicle 10, a second drive source 20 capable of selectively executing a power running control of outputting the drive force for running the vehicle or a regenerative control for recovering energy is provided. The second drive source 20 is linked to the output shaft 14 via a transmission 22. Therefore, the capacity of torque transmitted from the second drive source 20 to the output shaft 14 is increased or decreased in accordance with the speed change ratio $\gamma s$ (=the rotation speed of the second drive source (i.e. MG2)/the rotation speed of the output shaft 14) that is set by the transmission 22.

The transmission 22 is constructed so as to establish a plurality of steps whose speed change ratios $\gamma s$ is greater than or equal to "1". Therefore, at the time of power running when torque is output from the second drive source 20, the torque can be increased by the transmission 22 while being transmitted to the output shaft 14. Hence, the second drive source 20 is constructed with a further reduced capacity or in a further reduced size. Due to this, for example, in the case where the rotation speed of the output shaft 14 increases in association with high vehicle speed, the speed change ratio $\gamma s$ is dropped to drop the rotation speed of the second drive source 20, in order to maintain a good state of the operation efficiency of the second drive source 20. In the case where the rotation speed of the output shaft 14 drops, the speed change ratio $\gamma s$ is increased.

As for the shifting of the transmission 22, the torque capacity of the transmission 22 drops or inertial torque associated with change in the rotation speed occurs, in which case the torque of the output shaft 14, that is, the output shaft torque, is affected. Therefore, in the hybrid vehicle 10, on the occasion of shifting by the transmission 22, a control is performed such that the torque of the first drive source 12 is corrected so as to prevent or restrain the torque fluctuation of the output shaft 14.

The first drive source 12 is constructed mainly of an engine 24, a MG1 (hereinafter, referred to as "MG1"), and a planetary gear device 26 that functions as a motive power distribution mechanism for combining or distributing torque between the engine 24 and the MG1. The engine 24 is a publicly known internal combustion engine that outputs power by burning fuel, such as a gasoline engine, a diesel engine, etc. The engine 24 is constructed so that states of operation thereof, such as the throttle opening degree, the intake air amount, the fuel supply amount, the ignition timing, etc., are electrically controlled by an engine-controlling electronic control device (E-ECU) 28 that is made up mainly of a microcomputer. The electronic control device 28 is supplied with detection signals from an accelerator operation amount sensor AS that detects the operation amount of an accelerator pedal 27, a brake sensor BS for detecting operation of a brake pedal 29, etc.

The MG1 is, for example, a synchronous electric motor, and is constructed to selectively perform the function as an electric motor of generating drive torque and the function as an electric power generator. The MG1 is connected to an electricity storage device 32, such as a battery, a capacitor, etc., via an inverter 30. Then, the inverter 30 is controlled by a motor-generator-controlling electronic control device (MG-ECU) 34 made up mainly of a microcomputer so that the output torque of the MG1 or the regenerative torque is adjusted or set. The electronic control device 34 is supplied with detection signals from an operation position sensor SS that detects the operation position of a shift lever 35, a key switch KEYSW that detects the insertion of a key for activation operation, an activating operation button POWER that detects a command operation for activation operation, etc. The electronic control device 34 turns on a ready-to-run display READY that displays that the vehicle has become a ready-to-run state in response to the activation operation.

The planetary gear device 26 is a single-pinion type planetary gear mechanism that includes three rotating elements: a sun gear S0, a ring gear R0 disposed concentrically with the sun gear S0, and a carrier C0 that supports pinions P0 meshing with the sun gear S0 and the ring gear R0, in such a manner that the pinions P0 are rotatable about their own axes and also revolvable. The planetary gear device 26 causes known differential effect. The planetary gear device 26 is provided concentrically with the engine 24 and the transmission 22. Since the planetary gear device 26 and the transmission 22 are constructed substantially symmetrically about a center line, the half portions thereof below the center line are omitted in FIG. 1.

In this embodiment, a crankshaft 36 of the engine 24 is linked to the carrier C0 of the planetary gear device 26 via a damper 38. The sun gear S0 is linked to the MG1, and the output shaft 14 is linked to the ring gear R0. The carrier C0 functions as an input element, and the sun gear S0 functions as a reaction force element, and the ring gear R0 functions as an output element.

Figure 2:
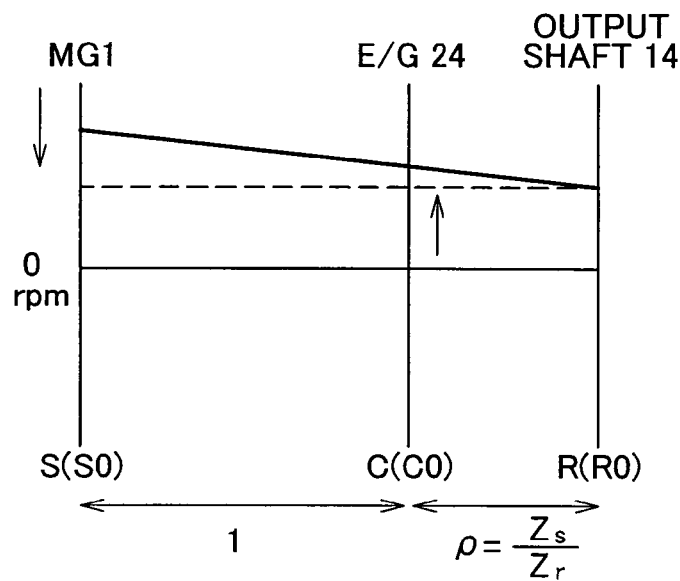
FIG. 2 is an alignment chart illustrating the operation of a planetary gear device of the hybrid vehicle shown in FIG. 1.

Relative relationships among the rotating elements of the single-pinion type planetary gear device 26 that functions as a torque combining-distributing mechanism are shown by an alignment chart in FIG. 2. In the alignment chart, a vertical axis S, a vertical axis C and a vertical axis R represent the rotation speed of the sun gear S0, the rotation speed of the carrier C0, and the rotation speed of the ring gear R0, respectively. The intervals between the vertical axis S, the vertical axis C and the vertical axis R are set so that when the interval between the vertical axis S and the vertical axis C is 1, the interval between the vertical axis C and the vertical axis R becomes $\rho$ (the number of teeth Zs of the sun gear S0/the number of teeth Zr of the ring gear R0).

In the planetary gear device 26, when a reaction torque from the MG1 is input to the sun gear S0 while the output torque of engine 24 is input to the carrier C0, a torque greater than the torque input from the engine 24 appears on the ring gear R0 that is the output element, so that the MG1 functions as an electric power generator. While the rotation speed of the ring gear R0 (output shaft rotation speed) NO is constant, the rotation speed NE of the engine 24 can be continuously (steplessly) changed by changing the rotation speed of the MG1 upward or downward. The dashed line in FIG. 2 shows a state where the rotation speed NE of the engine 24 drops when the rotation speed of the MG1 is lowered from the value shown by a solid line. That is, a control of setting the rotation speed NE of the engine 24 at, for example, a rotation speed that provides the best fuel economy, can be executed by controlling the MG1. This type of hybrid system is termed mechanical distribution system or split type.

Referring back to FIG. 1, the transmission 22 of the embodiment is constructed of one set of a Ravigneaux type planetary gear mechanism. Specifically, in the transmission 22, a first sun gear S1 and a second sun gear S2 are provided, and short pinions P1 mesh with the first sun gear S1. The short pinions P1 also mesh with long pinions P2 whose axial length is longer than that of the short pinions P1. The long pinions P2 mesh with a ring gear R1 that is disposed concentrically with the sun gears S1, S2. The pinions P1, P2 are supported by a common carrier C1 so as to be rotatable about their own axes and also revolvable. Besides, the second sun gear S2 meshes with the long pinions P2.

The second drive source 20 is constructed of a second motor-generator (hereinafter, referred to as "MG2") that is an electric motor or an electric power generator that is controlled by the motor-generator-controlling electronic control device (MG-ECU) 34 via an inverter 40 so that the assist-purpose output torque or the regenerative torque is adjusted or set. The MG2 is linked to the second sun gear S2, and the carrier C1 is linked to the output shaft 14. The first sun gear S1 and the ring gear R1, together with the pinions P1, P2, construct a mechanism that corresponds to a double-pinion type planetary gear device. The second sun gear S2 and the ring gear R1, together with the long pinions P2, construct a mechanism that corresponds to a single-pinion type planetary gear device.

The transmission 22 is also provided with a first brake B1 that is provided between the first sun gear S1 and a transmission housing 42 for selectively fixing the first sun gear S1, and a second brake B2 that is provided between the ring gear R1 and the transmission housing 42 for selectively fixing the ring gear R1. These brakes B1, B2 are so-called friction engagement devices that produce braking force by friction force. As the brakes, it is possible to adopt multi-plate type engagement devices or band-type engagement devices. Then, each of the brakes B1, B2 is constructed so that the torque capacity thereof continuously changes in accordance with the engagement pressure that is generated by a hydraulic actuator or the like.

In the transmission 22 constructed as described above, when the second sun gear S2 functions as an input element and the carrier C1 functions as an output element and the first brake B1 is engaged, a high speed step H whose speed change ratio γsh is greater than "1" is achieved. If the second brake B2 is engaged instead of the first brake B1 in a similar situation, a low speed step L whose speed change ratio γsl is greater than the speed change ratio γsh of the high speed step H is set. The shifting between the speed change steps H and L is executed on the basis of states of run of the vehicle such as the vehicle speed, the required drive force (or the accelerator operation amount), etc. More concretely, speed change step regions are determined beforehand as a map (shift chart), and a control is performed such as to set either one of the speed change steps in accordance with the detected vehicle driving state. A shift-controlling electronic control device (T-ECU) 44 made up mainly of a microcomputer for performing the control is provided.

The electronic control device 44 is supplied with detection signals from an oil temperature sensor TS for detecting the temperature of the working oil, a hydraulic switch SW1 for detecting the engagement oil pressure of the first brake B1, a hydraulic switch SW2 for detecting the engagement oil pressure of the second brake B2, a hydraulic switch SW3 for detecting the line pressure PL, etc.

Figure 3:
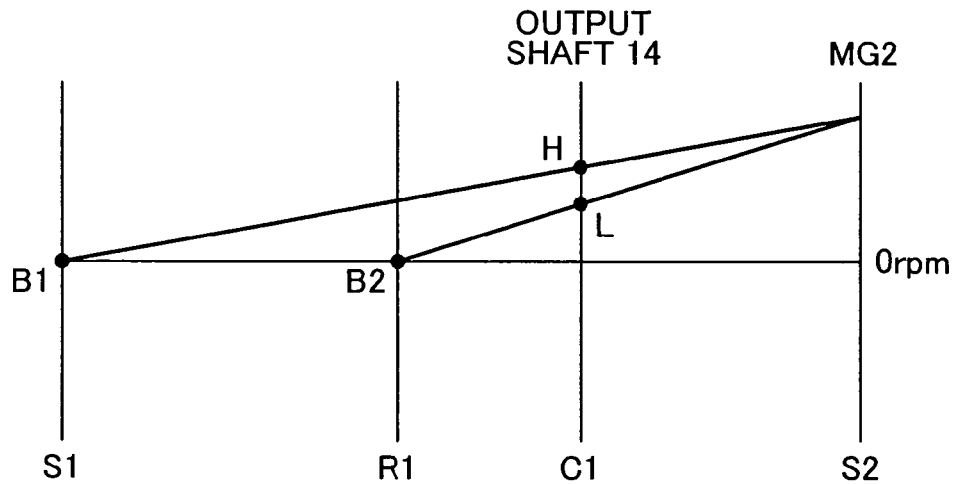
FIG. 3 is an alignment chart illustrating the operation of a stepped type transmission of the hybrid vehicle shown in FIG. 1.

FIG. 3 shows an alignment chart that has four vertical axes, that is, a vertical axis S1, a vertical axis R1, a vertical axis C1, and a vertical axis S2, in order to represent relative relationships between the rotating elements of the Ravigneaux type planetary gear mechanism that constitutes the transmission 22. The vertical axis S1, the vertical axis R1, the vertical axis C1 and the vertical axis S2 show the rotation speed of the first sun gear S1, the rotation speed of the ring gear R1, the rotation speed of the carrier C1, and the rotation speed of the second sun gear S2, respectively.

In the transmission 22 constructed as described above, when the ring gear R1 is fixed by the second brake B2, the low speed step L is set, and the assist torque the MG2 outputs is amplified in accordance with the corresponding speed change ratio γsl, and is thus applied to the output shaft 14. On the other hand, when the first sun gear S1 is fixed by the first brake B1, the high speed step H having the speed change ratio γsh that is smaller than the speed change ratio γhl of the low speed step L is set. Since the speed change ratio of the high speed step H is also larger than "1", the assist torque that the MG2 outputs is amplified in accordance with the speed change ratio γsh, and is applied to the output shaft 14.

Incidentally, although the torque applied to the output shaft 14 during a state where one of the speed change steps L, H is steadily set is a torque obtained by increasing the output torque of the MG2 in accordance with the corresponding speed change ratio, the torque during a shift transitional state of the transmission 22 is a torque that is affected by the torque capacity at the brake B1 or B2, the inertia torque associated with the rotation speed change, etc. Besides, the torque applied to the output shaft 14 becomes positive torque during a driving state of the MG2, and becomes negative torque during a driven state of the MG2.

Figure 4:
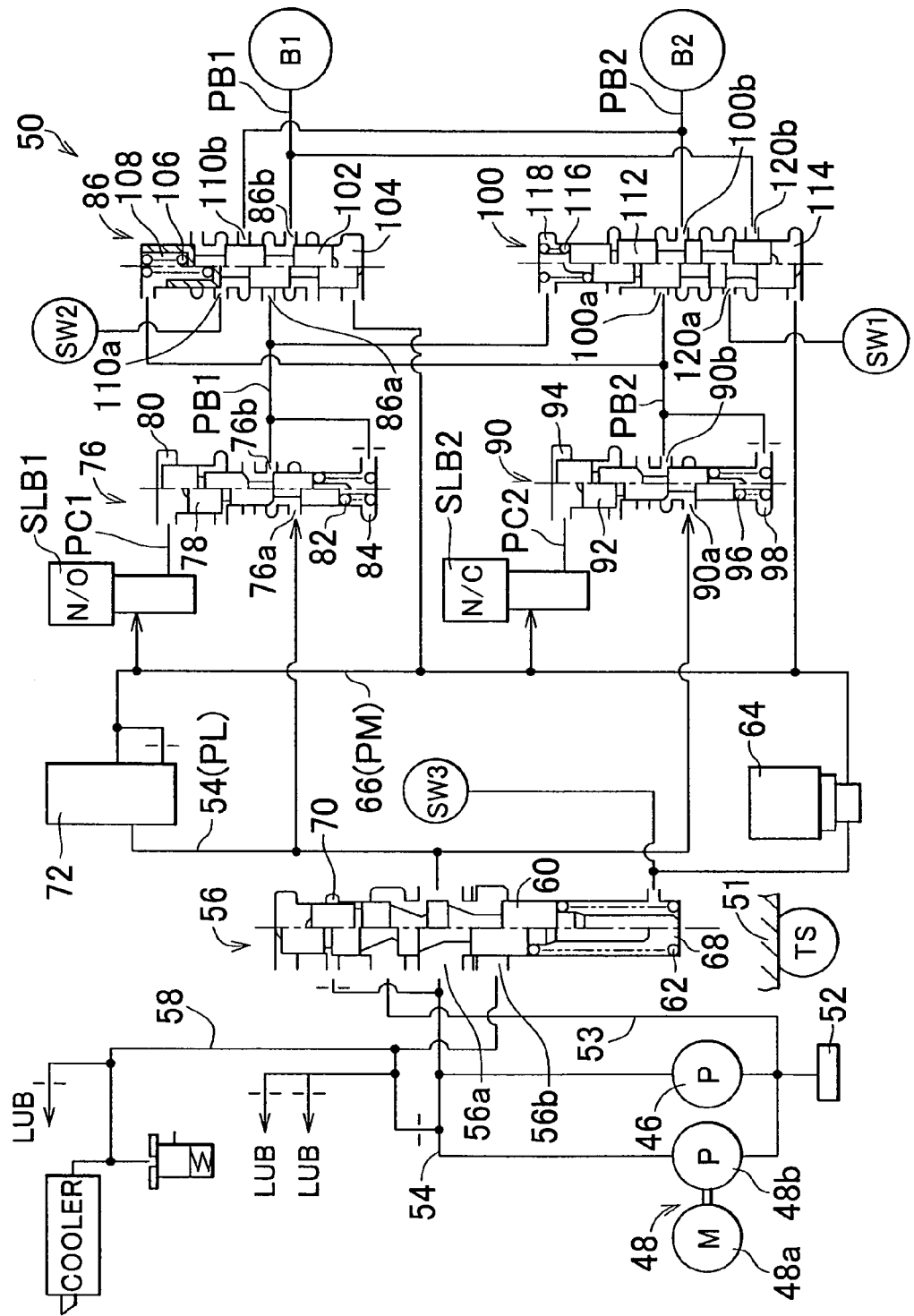
FIG. 4 is a diagram illustrating portions of a hydraulic control circuit for controlling the operation of the stepped type transmission shown in FIG. 3.

FIG. 4 shows a shift-purpose hydraulic control circuit 50 for automatically controlling the shifting of the transmission 22 by engaging and releasing the brakes B1, B2. The hydraulic control circuit 50 includes, as oil pressure sources, a mechanical type hydraulic pump 46 that is operatively linked to the crankshaft 36 of the engine 24 and therefore is rotationally driven by the engine 24, and an electric type hydraulic pump 48 that includes an electric motor 48a and a pump 48b that is rotationally driven by the electric motor 48a. The mechanical type hydraulic pump 46 and the electric type hydraulic pump 48 suck the working oil that is refluxed to an oil pan (not shown), via a strainer 52, or suck the working oil that is directly refluxed via a reflux oil passageway 53, and pumps the working oil to a line pressure oil passageway 54. An oil temperature sensor TS for detecting the oil temperature of the refluxed working oil is provided on a valve body 51 that forms the hydraulic control circuit 50, but may also be connected to a different site.

A line pressure regulating valve 56 is a relief-type pressure regulating valve, and includes a spool valve element 60 that opens and closes between a supply port 56a connected to the line pressure oil passageway 54 and a discharge port 56b connected to a drain oil passageway 58, a control oil chamber 68 which houses a spring 62 that generates thrust in the closing direction of the spool valve element 60 and which receives a module pressure PM in a module pressure oil passageway 66 via an electromagnetic open-close valve 64 when the set pressure of the line pressure PL is altered to a higher level, and a feedback oil chamber 70 connected to the line pressure oil passageway 54 which generates thrust in the opening direction of the spool valve element 60. The line pressure regulating valve 56 outputs a constant line pressure PL that is one of a low pressure and a high pressure. The control oil chamber 68 is provided with a hydraulic switch SW3 that is in an off-state while not supplied with the module pressure PM, and that is turned on when supplied with the module pressure PM. In the line pressure regulating valve 56, the line pressure PL is regulated so as to be the value on the low pressure side when the module pressure PM is not supplied into the control oil chamber 68, and the line pressure PL is regulated to so as to be the value on the high pressure side when the module pressure PM is supplied into the control oil chamber 68. Therefore, the hydraulic switch SW3 operates to the on-state when the line pressure PL in the line pressure oil passage 54 is at the value on the high pressure side, and operates to the off-state when the line pressure PL therein is at the value on the low pressure side. Since the hydraulic switch SW3 is disposed as described above, a so-called hunting phenomenon in which the on-off operation of the hydraulic switch SW3 repeatedly occurs even when the line pressure PL is on the low pressure side due to the pulsation of the working oil pressure fed from the pump 46 or 48b or the rising of the line pressure PL from the set pressure regulation value is avoided, as compared with the case where the hydraulic switch SW3 is connected to the line pressure oil passage 54.

A module pressure regulating valve 72 outputs to a module pressure oil passageway 66 a constant module pressure PM that is set lower than the low pressure-side line pressure PL, using the line pressure PL as an original pressure, regardless of fluctuations of the line pressure PL. A first linear solenoid valve SLB1 for controlling the first brake B1 and a second linear solenoid valve SLB2 for controlling the second brake B2, using the module pressure PM as an original pressure, output control pressures PC1 and PC2 in accordance with drive currents ISOL1 and ISOL2 that are command values from the electronic control device 44.

Figure 5:
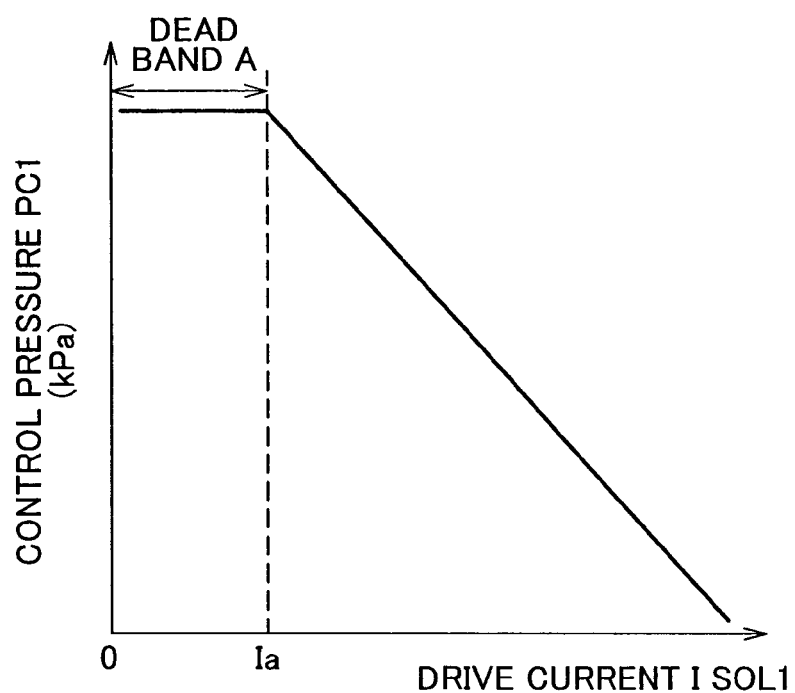
FIG. 5 is a diagram illustrating a normally open-type valve characteristic of a first linear solenoid valve used in FIG. 4.
Figure 6:
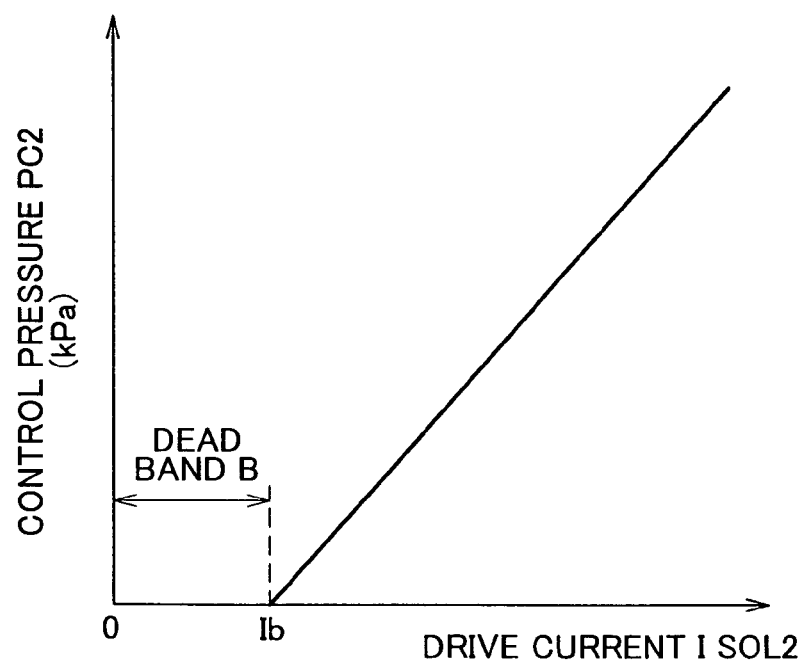
FIG. 6 is a diagram illustrating a normally closed-type valve characteristic of a second linear solenoid valve used in FIG. 4.

The first linear solenoid valve SLB1 has a normally open-type valve characteristic of establishing an open valve (communicated) state between the input port and the output port during the non-electrified state. As shown in FIG. 5, as the drive current ISOL1 increases, the output control pressure PC1 is dropped. As shown in FIG. 5, the valve characteristic of the first linear solenoid valve SLB1 is provided with a dead band A in which the output control pressure PC1 does not drop until the drive current ISOL1 exceeds a predetermined value Ia. The second linear solenoid valve SLB2 has a normally closed-type valve characteristic of establishing a closed (shut-off) state between the input port and the output port during the non-electrified state. As shown in FIG. 6, as the drive current ISOL2 increases, the output control pressure PC2 is increased. As shown in FIG. 6, the valve characteristic of the second linear solenoid valve SLB2 is provided with a dead band B in which the output control pressure PC2 does not increase until the drive current ISOL2 exceeds a predetermined value Ib.

A B1 control valve 76 includes a spool valve element 78 that opens and closes between an input port 76a connected to the line pressure oil passageway 54 and an output port 76b that outputs a B1 engagement oil pressure PB1, a control oil chamber 80 that receives the control pressure PC1 from the first linear solenoid valve SLB1 in order to urge the spool valve element 78 in the opening direction, and a feedback oil chamber 84 which houses a spring 82 that urges the spool valve element 78 in the closing direction and which receives the B1 engagement oil pressure PB1 that is the output pressure. The B1 control valve 76, using the line pressure PL in the line pressure oil passageway 54 as an original pressure, outputs the B1 engagement oil pressure PB1 whose magnitude is in accordance with the control pressure PC1 from the first linear solenoid valve SLB1, and supplies it to the brake B1 through a B1 apply control valve 86 that functions as an interlock valve.

A B2 control valve 90 includes a spool valve element 92 that opens and closes between an input port 90a connected to the line pressure oil passageway 54 and an output port 90b that outputs a B2 engagement oil pressure PB2, a control oil chamber 94 that receives the control pressure PC2 from the second linear solenoid valve SLB2 in order to urge the spool valve element 92 in the opening direction, and a feedback oil chamber 98 which houses a spring 96 that urges the spool valve element 92 in the closing direction and which receives the B2 engagement oil pressure PB2 that is the output pressure. The B2 control valve 90, using the line pressure PL in the line pressure oil passageway 54 as an original pressure, outputs the B2 engagement oil pressure PB2 whose magnitude is in accordance with the control pressure PC2 from the second linear solenoid valve SLB2, and supplies it to the brake B2 through a B2 apply control valve 100 that functions as an interlock valve.

The B1 apply control valve 86 includes a spool valve element 102 which opens and closes an input port 86a that receives the B1 engagement oil pressure PB1 output from the B1 control valve 76 and an output port 86b connected to the first brake B1, an oil chamber 104 that receives the module pressure PM in order to urge the spool valve element 102 in the opening direction, and an oil chamber 108 which houses a spring 106 that urges the spool valve element 102 in the closing direction and which receives the B2 engagement oil pressure PB2 output from the B2 control valve 90. The B1 apply control valve 86 is held in the open valve state until it is supplied with the B2 engagement oil pressure PB2 for engaging the second brake B2. When the B2 engagement oil pressure PB2 is supplied, the B1 apply control valve 86 is switched to the closed valve state, so that the engagement of the first brake B1 is prevented.

The B1 apply control valve 86 is provided with a pair of ports 110a and 110b that are closed when the spool valve element 102 is in the open valve position (position as indicated on the right side of a center line shown in FIG. 4), and that are opened when the spool valve element 102 is in the valve closed position (position as indicated on the left side of the center line shown in FIG. 4). The hydraulic switch SW2 for detecting the B2 engagement oil pressure PB2 is connected to the port 110a, and the second brake B2 is directly connected to the other port 110b. The hydraulic switch SW2 assumes an on-state when the B2 engagement oil pressure PB2 becomes a high-pressure state that is set beforehand, and is switched to an off-state when the B2 engagement oil pressure PB2 reaches or goes below a low-pressure state that is set beforehand. Since the hydraulic switch SW2 is connected to the second brake B2 via the B1 apply control valve 86, it is possible to determine the presence/absence of an abnormality of the first linear solenoid valve SLB1, the B1 control valve 76, the B1 apply control valve 86, etc., that constitute the hydraulic system of the first brake B1, as well as the presence/absence of abnormality of the B2 engagement oil pressure PB2.

The B2 apply control valve 100, similar to the B1 apply control valve 86, includes a spool valve element 112 that opens and closes between an input port 100a that receives the B2 engagement oil pressure PB2 output from the B2 control valve 90 and an output port 100b connected to the second brake B2, an oil chamber 114 that receives the module pressure PM in order to urge the spool valve element 112 in the opening direction, and an oil chamber 118 which houses a spring 116 that urges the spool valve element 112 in the closing direction and which receives the B1 engagement oil pressure PB1 output from the B1 control valve 76. The B2 apply control valve 100 is held in the open valve state until it is supplied with the B1 engagement oil pressure PB1 for engaging the first brake B1. When the B1 engagement oil pressure PB1 is supplied, the B2 apply control valve 100 is switched to the closed valve state, so that the engagement of the second brake B2 is prevented.

The B2 apply control valve 100 is also provided with a pair of parts 120a and 120b that are closed when the spool valve element 112 is in the open valve position (position as indicated on the right side of a center line shown in FIG. 4), and that are opened when the spool valve element 112 is in the valve closed position (position as indicated on the left side of the center line shown in FIG. 4). The hydraulic switch SW1 for detecting the B1 engagement oil pressure PB1 is connected to the port 120a, and the first brake B1 is directly connected to the other port 120b. The hydraulic switch SW1 assumes an on-state when the B1 engagement oil pressure PB1 becomes a high-pressure state that is set beforehand, and is switched to an off-state when the B1 engagement oil pressure PB1 reaches or goes below a low-pressure state that is set beforehand. Since the hydraulic switch SW1 is connected to the first brake B1 via the B2 apply control valve 100, it is possible to determine the presence/absence of an abnormality of the second linear solenoid valve SLB2, the B2 control valve 90, the B2 apply control valve 100, etc., that constitute the hydraulic system of the second brake B2, as well as the presence/absence of abnormality of the B1 engagement oil pressure PB1.

Figures 7, 8, 9:
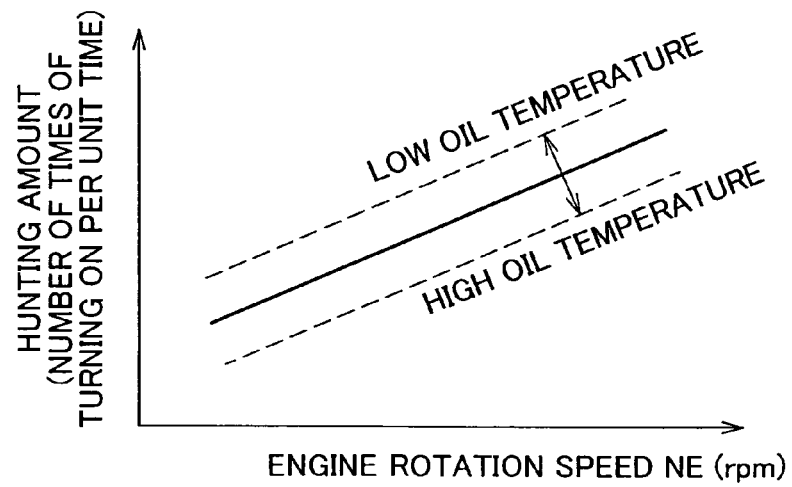
FIG. 7 is a table illustrating relationships among the speed change steps of the stepped type transmission shown in FIG. 1, the states of operation of the first linear solenoid valve and the second linear solenoid valve for achieving the speed change steps, and the states of operation of a first brake B1 and a second brake B2.
FIG. 8 is a table illustrating relationships among the operation of hydraulic switches SW1, SW2, SW3 provided in a hydraulic control circuit shown in FIG. 4, and the pressure states of the line pressure, and the states of shift of the stepped type transmission.
FIG. 9 is a diagram illustrating a hunting characteristic of the hydraulic switches SW1, SW2 provided in the hydraulic control circuit shown in FIG. 4.

FIG. 7 is a table illustrating operations of the hydraulic control circuit 50 constructed as described above. In FIG. 7, symbol "○" shows the excited state or the engaged state, and symbol "X" shows the non-excited state or the released state. That is, by putting both the first linear solenoid valve SLB1 and the second linear solenoid valve SLB2 into the excited state, the first brake B1 is put into the released state and the second brake B2 is put into the engaged state, so that the low speed step L of the transmission 22 is achieved. By putting both the first linear solenoid valve SLB1 and the second linear solenoid valve SLB2 into the non-excited state, the first brake B1 is put into the engaged state and the second brake B2 is put into the released state, so that the high speed step H of the transmission 22 is achieved.

Therefore, the hydraulic switches SW1, SW2, SW3 assumes the on and off-states as shown in FIG. 8 as long as they are in the normal state. Specifically, each of the hydraulic switches SW1, SW2, SW3 is in the off-state when the line pressure PL is in the low pressure state regardless of the speed change steps of the transmission 22. However, when the line pressure PL is in the high pressure state, the hydraulic switches SW2 and SW3 are put in the on-state if the transmission 22 is at the low speed step L. If the transmission 22 is at the high speed step H when the line pressure PL is in the high pressure state, the hydraulic switches SW1 and SW3 are put in the on-state. The hydraulic switches SW1, SW2, SW3 have an on-off switch structure in which the switching is performed upon application of a working pressure or higher pressure. Therefore, if the oil pressure to be detected includes pulsation (pressure vibration), a hunting state where the switch goes on and off repeatedly may occur even at oil pressures below the working pressure. In this embodiment, since the mechanical type hydraulic pump 46 and the electric type hydraulic pump 48, which function as oil pressure sources, are constant volume-type pumps such as gear-type pumps or the like, the working oil pressure fed from the pumps 46, 48 inevitably includes pressure vibration. However, since the electric type hydraulic pump 48 is of a smaller capacity than the mechanical type hydraulic pump 46, what matters is solely the mechanical type hydraulic pump 46. For example, when the engine rotation speed NE is 1200 rpm or higher, the hunting phenomenon occurs. FIG. 9 shows a relationship between the rotation speed NE of the engine 24 that drives the mechanical type hydraulic pump 46 and the hunting amount of the hydraulic switches SW1, SW2. In this relationship, as the engine rotation speed NE increases, the hunting amount of the hydraulic switches SW1, SW2, that is, the number of times of turning on per unit time thereof, increases. Besides, this characteristic increases as the working oil temperature becomes lower, and drops as the working oil temperature becomes higher.

Figure 10:
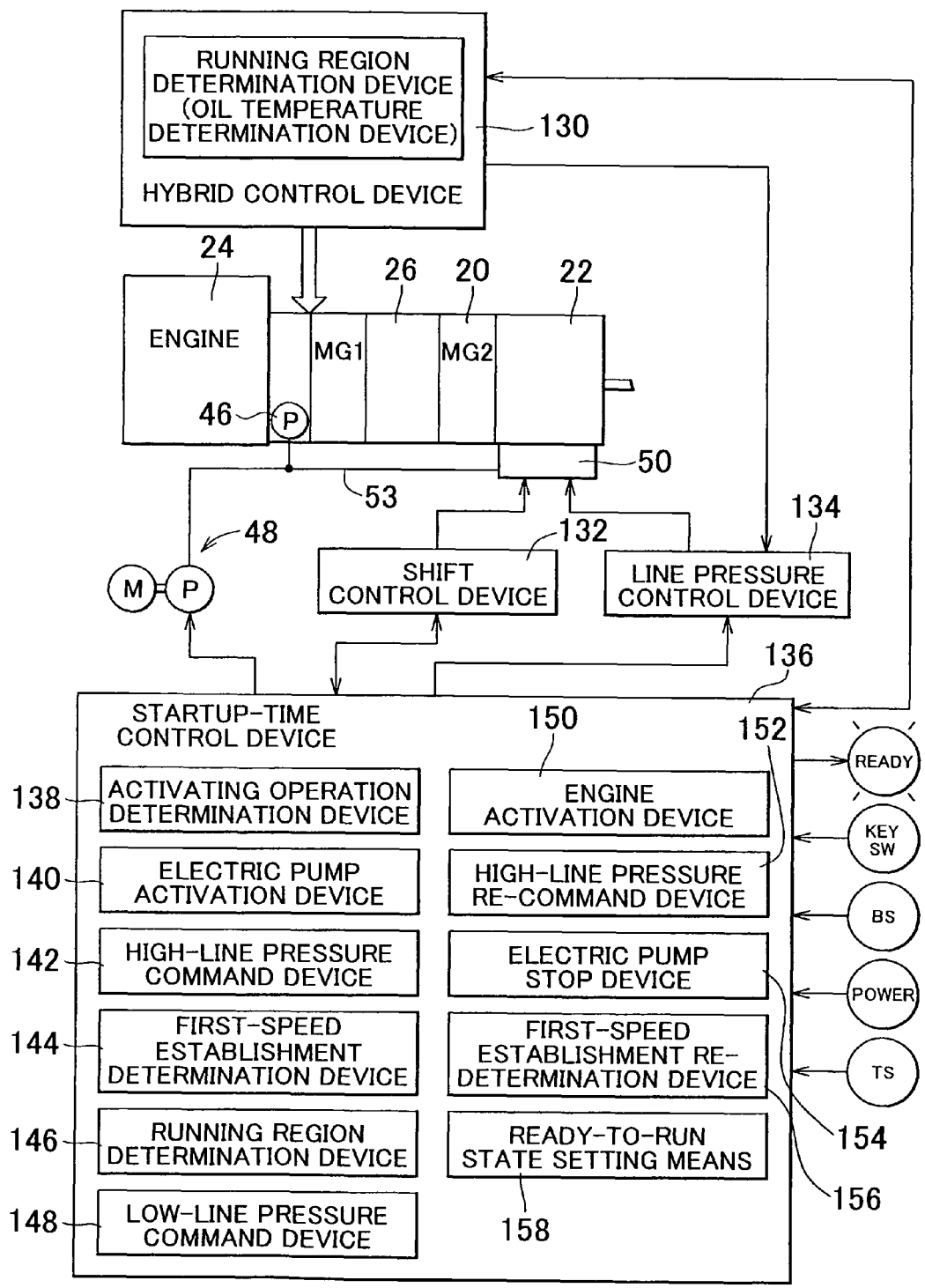
FIG. 10 is a functional block diagram illustrating portions of the control functions of electronic control devices shown in FIG. 1.

FIG. 10 is a functional block diagram illustrating portions of control functions of the electronic control devices 28, 34 and 44 (see FIG. 1). In FIG. 10, for example, when the control is activated as the power switch is operated during a state while the brake pedal is operated following the insertion of the key into the key slot, the hybrid drive control device 130 calculates a driver's requested output on the basis oft he accelerator operation amount, and causes the engine 24 and/or the MG2 to generate the requested output so as to bring about an operation with good fuel economy and low emission gas amount. For example, the run mode is switched in accordance with the state of run of the vehicle, among a motor run mode in which the engine 24 is stopped and the MG2 is solely used as drive source, a run mode in which the vehicle is run by using the MG2 as a drive source while electric power is generated from the motive power of the engine 24, and an engine run mode in which the motive power of the engine 24 is mechanically transmitted to the wheels 18.

The hybrid drive control device 130 controls the rotation speed of the engine 24 via the MG1 so that the engine 24 operates on an optimal fuel economy curve, even when the engine 24 is driven. Besides, in the case where the MG2 is driven for the torque assist, the hybrid control device 130 sets the transmission 22 to the low speed step L to increase the torque applied to the output shaft 14 during a state of low vehicle speed. During a state of increased vehicle speed, the hybrid control device 130 sets the transmission 22 to the high speed step H to relatively drop the rotation speed of the MG2 and therefore reduce the loss. Thus, the torque assist with good efficiency is executed. Furthermore, during the coasting run, the inertia energy that the vehicle has is used to rotationally drive the MG1 or the MG2, so that the energy is regenerated as electric power that is stored into the electricity storage device 32.

Figure 11:
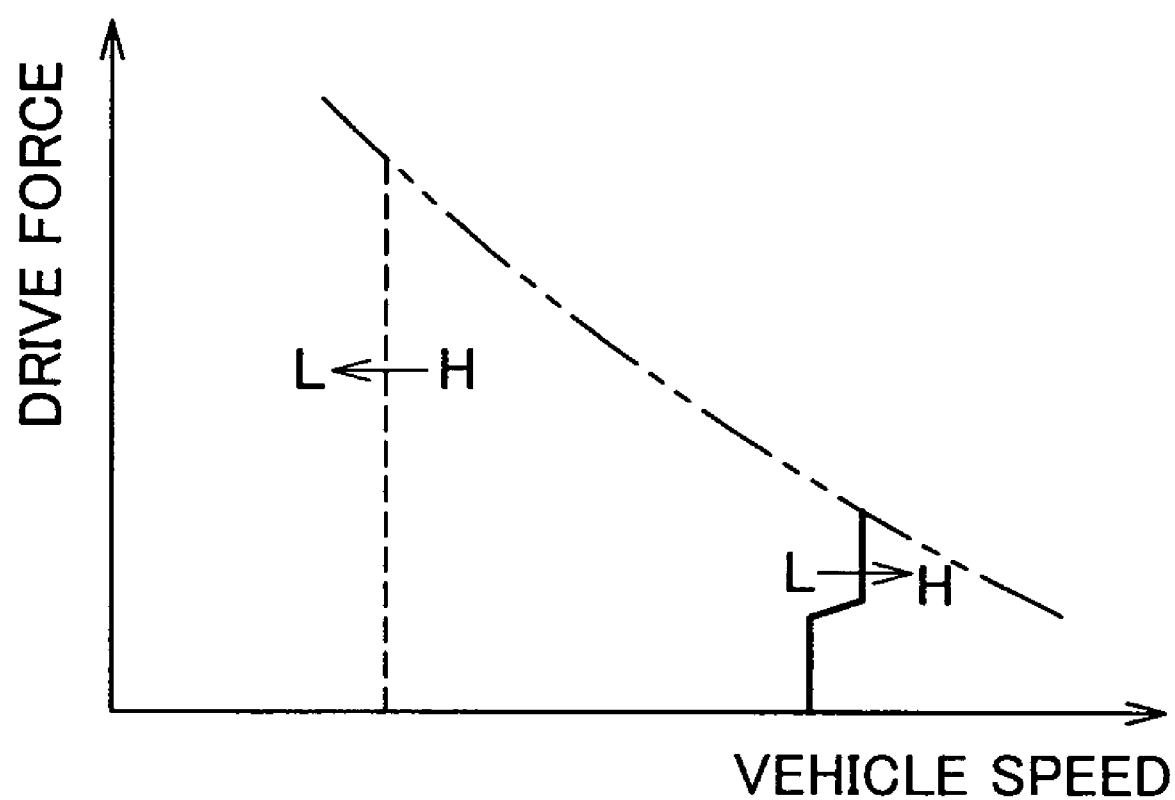
FIG. 11 is a diagram showing a shift chart that is used in a shift control device shown in FIG. 10.

A shift control device 132 determines a speed change step of the transmission 22 on the basis of the speed V and the force P of the vehicle from a pre-stored shift chart, for example, as shown in FIG. 11, and controls the first brake B1 and the second brake B2 so that the switch to the determined speed change step is automatically performed.

In the case where the calculated driver's requested output is greater than a pre-set output criterion value, or in the case where the transmission 22 is performing a shift, that is, is in a shift transition state, or the like, a line pressure control device 134 switches the set pressure of the line pressure PL from a low pressure state to a high pressure state by switching the electromagnetic open-close valve 64 from the closed state to the open state to supply the module pressure PM into the oil chamber 68 of the line pressure regulating valve 56 and to therefore increase the thrust on the spool valve element 60 in the closing direction by a predetermined value.

A startup-time control device 136 includes an activating operation determination device 138, an electric pump activation device 140, a high-line pressure command device 142, a first-speed establishment determination device 144, a running region determination device 146, a low-line pressure command device 148, an engine activation device 150, a high-line pressure re-command device 152, an electric pump stop device 154, a first-speed establishment re-determination device 156, and a ready-to-run state setting device 158. In response to the activating operation, the startup-time control device 136 outputs a command to establish the first speed gear step (which herein refers to the aforementioned low speed step L) of the transmission 22. When a predetermined ready-to-run condition is met, the startup-time control device 136 sets the ready-to-run state, and lights a ready-to-run display READY.

The activating operation determination device 138 determines that the activating operation for acting the hybrid control system has been performed, if the activating operation button POWER is operated when the key has been inserted and the brake pedal 29 has been operated. If the activating operation determination device 138 determines that the activating operation has been performed, the electric pump activation device 140 starts to drive the electric type hydraulic pump 48 in order to perform the raising of the line pressure PL, and the high-line pressure command device 142 commands the line pressure control device 134 to bring the line pressure PL to a high pressure state. The first-speed establishment determination device 144 determines whether or not the first-speed gear step (that herein refers to the "low speed step") L has been established due to the working oil being supplied to the brake B2 so that the low speed step L of the transmission 22 will be achieved in response to the determination of the activating operation, on the basis of the output signal of the hydraulic switch SW2. The running region determination device 146 determines whether or not the state of the vehicle is in a non-motor run region, that is, a non-EV region, for example, during a time of low temperature when the working oil temperature is below a predetermined temperature, for example, 10°C., and therefore the warmup is needed, or during a time when the remaining amount of the electricity storage device 32 is short, or the like, on the basis of the state of the vehicle.

If the running region determination device 146 determines that the state of the vehicle is in the motor run region (EV region), the ready-to-run state setting device 158 displays that the vehicle has entered a ready-to-run state by lighting the ready-to-run display READY. Therefore, in the case where the run involving the operation of the engine 24 is needed, for example, during the low temperature time when the warmup is needed, the time when the remaining amount of the electricity storage device 32 is short, etc., if the running region determination device 146 determines that the state of the vehicle is in the non-motor run region (non-EV region), the low-line pressure command device 148 gives a command to temporarily bring the line pressure PL to the low pressure state, and the engine activation device 150 starts up the engine 24 through the use of the MG1, and thereby starts the operation of the mechanical type hydraulic pump 46. The electric pump stop device 154 stops the electric type hydraulic pump 48 after a predetermined overlap period L1 elapses following the startup of the engine 24. Subsequently, when a pre-set oil pressure bleeding period L2 elapses following the low pressure command regarding the line pressure PL, the high-line pressure re-command device 152 commands the line pressure control device 134 to bring the line pressure PL again to the high pressure state. The oil pressure bleeding period L2 is a period that is set beforehand so that the oil pressure will sufficiently bleed from the hydraulic switch SW2. The first-speed establishment re-determination device 156 determines whether or not the low speed step L of the transmission 22 has been established in response to the high pressure state of the line pressure on the basis of whether or not the engagement of the brake B2 has been confirmed by the output signal of the hydraulic switch SW2. When the first-speed establishment re-determination device 156 determines that the low speed step L of the transmission 22 has been established, the ready-to-run state setting device 158 determines that the activation of the hybrid control system has been completed, and sets the ready-to-run state.

Figure 12:
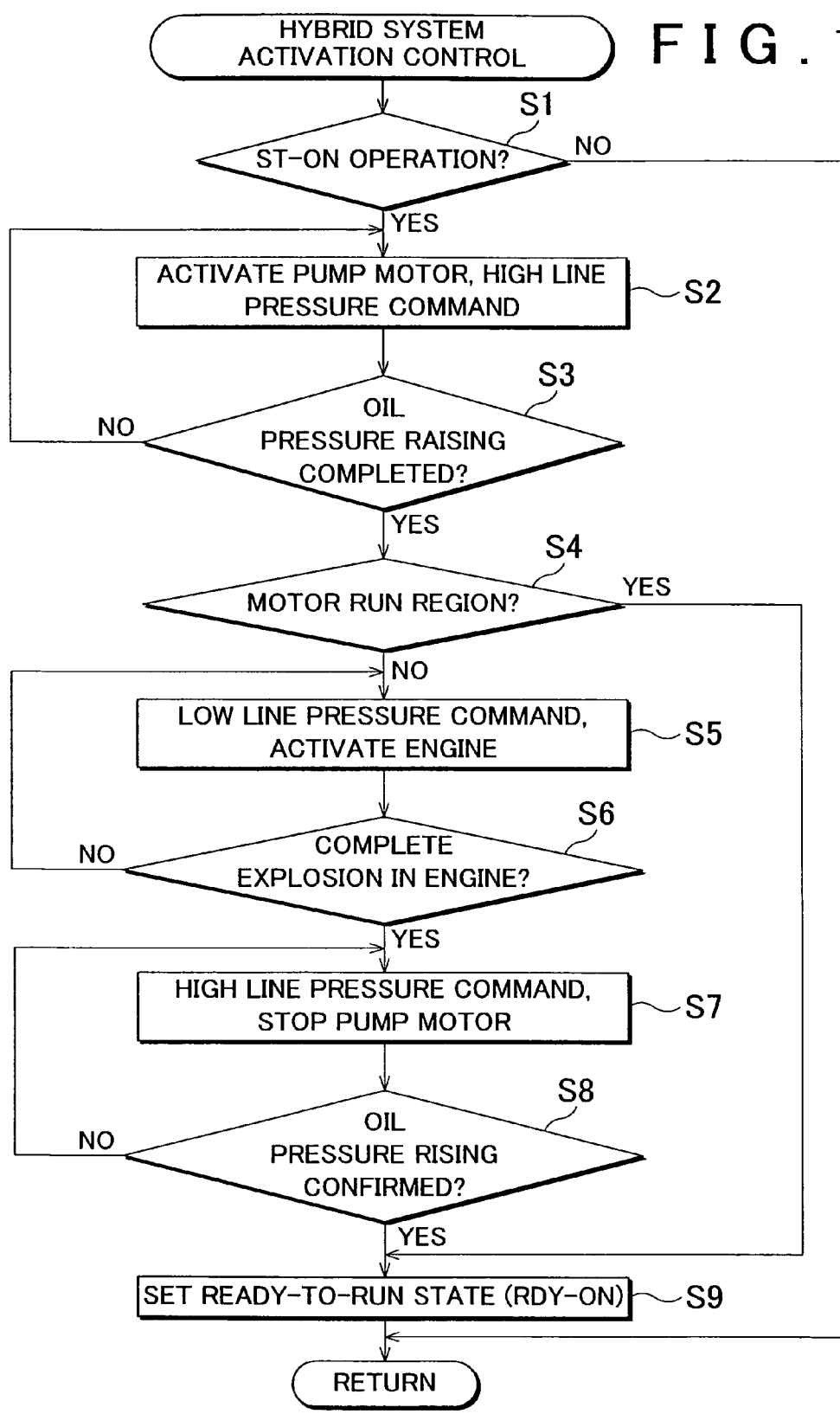
FIG. 12 is a flowchart illustrating portions of the control operations of the electronic control devices shown in FIG. 1.
Figure 13:
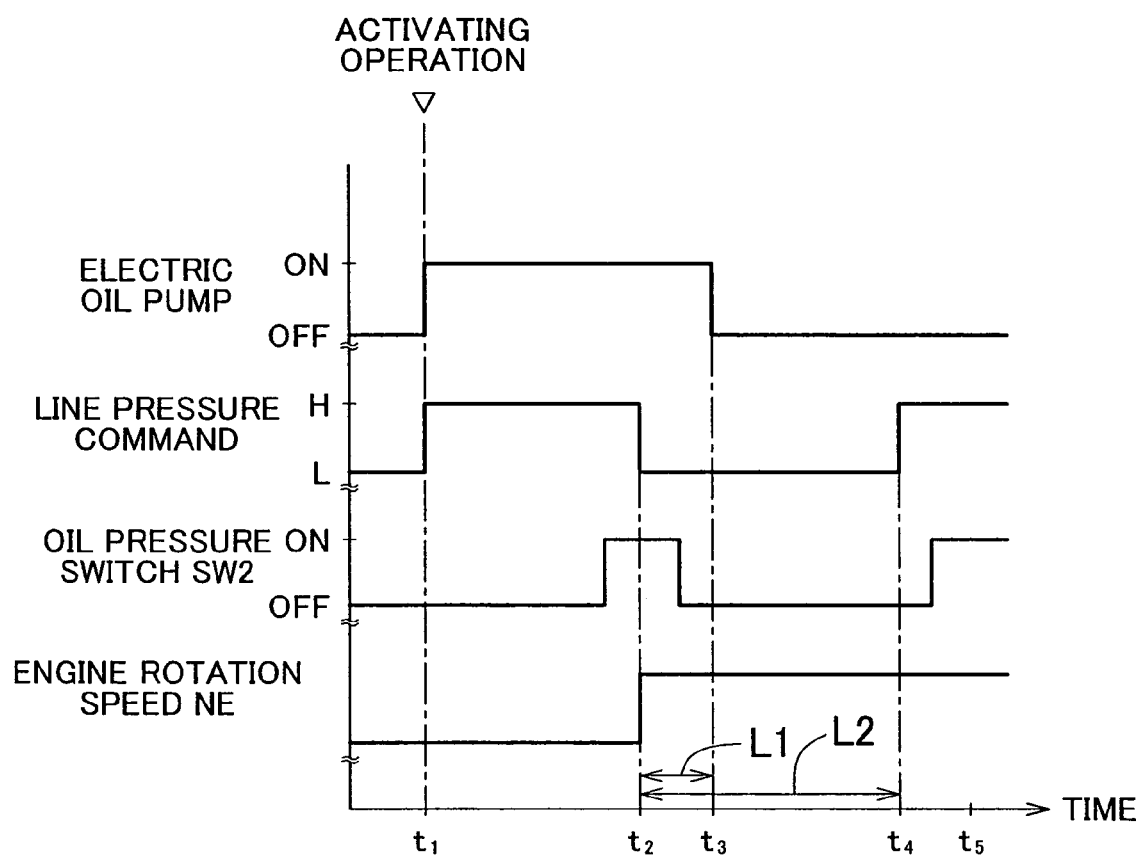
FIG. 13 is a time chart illustrating portions of the control operations of the electronic control devices shown in FIG. 1.

FIG. 12 is a flowchart illustrating portions of the control operations of the electronic control devices 28, 34 and 44. In FIG. 12, in a step (hereinafter, "step" will be omitted) S1 corresponding to the activating operation determination device 138, it is determined whether or not the activating operation for activating the hybrid control system has been performed on the basis of whether or not the activating operation button POWER has been operated while the key has been inserted and the brake pedal 29 has been operated. If a negative judgment is made in S1, this routine is ended. If an affirmative judgment is made in S1, the process proceeds to S2 corresponding to the electric pump activation device 140 and the high-line pressure command device 142. In S2, the electric type hydraulic pump 48 is activated so that the raising of the line pressure PL is performed, and also the command to bring the line pressure PL to the high pressure state is output. In FIG. 13, time point t1 shows this state. Due to this, the high pressure-side working oil is supplied to the brake B2 so as to achieve the low speed step L of the transmission 22.

Next, in S3 corresponding to the first-speed establishment determination device 144, it is judged whether or not the low speed step L of the transmission 22 has been established by the engagement of the brake B2 on the basis of the output signal of the hydraulic switch SW2. As long as a negative judgment is made in S3, the process of S2 and subsequent steps is repeatedly executed. However, when an affirmative judgment is made in S3, the process proceeds to S4 corresponding to the running region determination device 146. In S4, on the basis of the state of the vehicle, it is judged whether or not the state of the vehicle is in the motor run region in which the vehicle runs by the MG1 and/or the MG2 without needing the operation of the engine 24. If an affirmative judgment is made in S4, the ready-to-run state is set in S9 corresponding to the ready-to-run state setting device 158. However, in the case where a negative judgment is made in S4, the state of the vehicle is in the non-motor run region, that is, the non-EV region, for example, during the low temperature time when the warmup is needed, or during the time when the remaining amount of the electricity storage device 32 is short, or the like, and therefore the process of S5 to S8 is executed.

Firstly, in S5 corresponding to the low-line pressure command device 148 and the engine activation device 150, the command to temporarily bring the line pressure PL to the low pressure state is output, and the engine 24 is started up by the MG1, and therefore the operation of the mechanical type hydraulic pump 46 is started. In FIG. 13, time point t2 shows this state. Subsequently in S6, it is judged whether or not the startup of the engine 24 has been completed, and the engine 24 has entered a sustainable self-rotating state, that is, a complete explosion state. As long as a negative judgment is made in S6, the process of S5 and subsequent steps is repeatedly executed. However, when an affirmative judgment is made in S6, the process proceeds to S7 corresponding to the high-line pressure re-command device 152 and the electric pump stop device 154. In S7, after the predetermined overlap period L1 elapses, the electric type hydraulic pump 48 is stopped (at time point t3 in FIG. 13), and when the pre-set oil pressure bleeding period L2 elapses following the low pressure command regarding the line pressure PL, the command to bring the line pressure PL to the high pressure state is output. In FIG. 13, time point t4 shows this state. Next, in S8 corresponding to the first-speed establishment re-determination device 156, it is judged whether or not the high pressure state of the line pressure PL has been brought about and the brake B2 has been engaged so that the first speed step L is established again, by the output signal of the hydraulic switch SW2. As long as a negative judgment is made in S8, the process of S7 and subsequent steps is repeatedly executed. However, when an affirmative judgment is made in S8, the ready-to-run state is set in S9 corresponding to the ready-to-run state setting device 158. In FIG. 13, time point t5 shows this state.

As described above, according to the control device of the hybrid vehicle 10 of this embodiment, in the case where the running region determination device 146 determines that the state of the vehicle is in the non-motor run region, the startup-time control device 136 sets the line pressure PL, which is the original source of the brake B2 (hydraulic type friction engagement device), to the low pressure state (non-working pressure) where the hydraulic switch SW2 does not operate, as the engine 24 is started up. After the engine 24 undergoes the complete explosion, the startup-time control device 136 sets the line pressure PL to the working pressure (high pressure state) where the hydraulic switch SW2 operates. Therefore, during the activating period t1 to t5 following the activating operation, the engine 24 is started up, so that the mechanical type hydraulic pump 46 driven by the engine 24 is operated and, simultaneously, the oil pressure command regarding the line pressure PL is switched from the low pressure side to the high pressure side. When the rise of the line pressure PL to the high pressure side is to be confirmed by the operation of the hydraulic switch SW2, the low pressure command regarding the line pressure PL is preferentially output. After a predetermined period, the high pressure command is output. After the operation of the hydraulic switch SW2 corresponding to the output of the high pressure command is confirmed, the ready-to-run state is set. Hence, the period (time point 1 to time point 5) from the activating operation to the setting of the ready-to-run state, that is, the activating period following the activating operation, is stably shortened.

Furthermore, according to the control device of the hybrid vehicle 10 of this embodiment, the running region determination device 146 determines that the state of the vehicle is in the motor run on the ground that the temperature of the working oil supplied to the brake B2 (hydraulic type friction engagement device) exceeds the pre-set oil temperature criterion value. Therefore, even in the case where the engine rotation speed NE is made high, for example, during the fast idle rotation at the time of low oil temperature, or the like, the time from the activating operation to the setting of the ready-to-run state is further shortened.

Furthermore, according to the control device of the hybrid vehicle 10 of this embodiment, the control device includes the electric type hydraulic pump 48 that is connected in parallel with the mechanical type hydraulic pump 46 and that feeds the working oil, and the startup-time control device 136 activates the electric type hydraulic pump 48 in response to the activating operation, and sets the line pressure PL, which is the original pressure of the brake B2, to the high pressure state. If the state of the vehicle is in the non-motor run region, the startup-time control device 136, in response to the operation of the hydraulic switch SW2, stops the operation of the electric type hydraulic pump 48, and starts up the engine 24 and sets the line pressure PL to the low pressure state. After a predetermined time following the setting of the low pressure state of the line pressure PL, the startup-time control device 136 sets the line pressure PL to the high pressure state, and then sets the ready-to-run state on the basis of the operation of the hydraulic switch SW2. Therefore, even when the mechanical type hydraulic pump 46 that is rotationally driven by the engine 24 is used together with the electric type hydraulic pump 48, the time from the activating operation to the setting of the ready-to-run state is further shortened.

Furthermore, according to the control device of the hybrid vehicle 10 of this embodiment, the startup-time control device 136 stops the operation of the electric type hydraulic pump 48 and starts up the engine 24 so that the overlap period L1 during which the operation of the electric type hydraulic pump 48 and the operation of the engine 24 overlap is formed. Therefore, the drop of the line pressure PL is suitably avoided at the time of the switch between the stop of the electric type hydraulic pump 48 and the activation of the mechanical type hydraulic pump 46 driven by the engine 24.

Furthermore, according to the control device of the hybrid vehicle 10 of this embodiment, since the engine 24 is started up by the first motor-generator MG1, there is an advantage of eliminating the need for a starter motor.

While an embodiment of the invention has been described above with reference to the drawings, the invention is applicable in other fashions as well.

For example, although the transmission 22 is a two-step transmission having the low speed step L and the high speed step H, it may also be a transmission of three of more speed steps.

Furthermore, although the electric type hydraulic pump 48 is constructed of the electric motor 48a and the pump 48b that is rotationally driven thereby, the electric type hydraulic pump 48 may be constructed of an electromagnetic pump in which the pump is driven by an electromagnetic vibrator, or the like.

Furthermore, although in the foregoing embodiment, the activating operation of the hybrid control system is determined as the activating operation button POWER is operated during a brake operation after the key has been inserted in the slot. However, the activating operation of the hybrid control system may also be determined by an operation of another device or a procedure.

Furthermore, although the hybrid vehicle of the foregoing embodiment is of a type in which the drive wheels 18, that is, the pair of left and right front wheels or rear wheels, the hybrid vehicle may also be a type of vehicle whose four wheels in the front and rear are driven.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control device of a hybrid vehicle including a motive power distribution mechanism that distributes an output of an engine to a first motor-generator and to an output shaft at a driving wheel side, a second motor-generator that outputs a power to the output shaft via a stepped type transmission, and an electricity storage device, comprising:
a startup-time control device that, in response to an activating operation of the hybrid vehicle, engages a hydraulic type friction engagement device provided in the stepped type transmission and sets a ready-to-run state based on a predetermined pressure of the hydraulic type friction engagement device;
a hydraulic pump that is rotationally driven by the engine to feed a working oil; and
a run region determination device that determines whether the hybrid vehicle is in a motor run region or a non-motor run region,
wherein if the run region determination device determines that the hybrid vehicle is in the non-motor run region, the startup-time control device sets an original pressure of the hydraulic type friction engagement device at a first predetermined pressure as the engine is started up, and sets the original pressure at a second predetermined pressure after the engine undergoes a complete explosion.

2. The control device of the hybrid vehicle according to claim 1, further comprising a hydraulic switch that detects an oil pressure of the hydraulic type friction engagement device, wherein the first predetermined pressure is a non-working pressure at which the hydraulic switch does not operate, and the second predetermined pressure is a working pressure at which the hydraulic switch operates.

3. The control device of the hybrid vehicle according to claim 2, wherein the run region determination device determines that the hybrid vehicle is in the non-motor run region on a ground that a temperature of the working oil supplied to the hydraulic type friction engagement device is below a pre-set criterion value.

4. The control device of the hybrid vehicle according to claim 2, wherein the run region determination device determines that the hybrid vehicle is in the non-motor run region on a ground that a stored electricity amount of the electricity storage device is below a predetermined value.

5. The control device of the hybrid vehicle according to claim 2, further comprising an electric hydraulic pump that is connected to the hydraulic pump in parallel and feeds the working pressure,
wherein the startup-time control device, in response to the activating operation, activates the electric hydraulic pump, and sets the original pressure of the hydraulic type friction engagement device at the working pressure, and wherein if the hybrid vehicle is in the non-motor run region, the startup-time control device, in response to an operation of the hydraulic switch, stops operation of the electric hydraulic pump, and starts up the engine, and sets the original pressure of the hydraulic type friction engagement device at the non-working pressure, and wherein after a predetermined time following setting of the non-working pressure, the startup-time control device sets the original pressure of the hydraulic type friction engagement device at the working pressure, and then sets the ready-to-run state based on the operation of the hydraulic switch.

6. The control device of the hybrid vehicle according to claim 5, wherein the startup-time control device stops the operation of the electric hydraulic pump after an overlap period during which the operation of the electric hydraulic pump and the operation of the engine overlap is formed.

7. The control device of the hybrid vehicle according to claim 1, wherein the engine is started up by the first motor-generator.

8. A control method of a hybrid vehicle including a motive power distribution mechanism that distributes an output of an engine to a first motor-generator and to an output shaft at a driving wheel side, a second motor-generator that outputs a power to the output shaft via a stepped type transmission, and an electricity storage device, comprising:

engaging a hydraulic type friction engagement device provided in the stepped type transmission, in response to an activating operation of the hybrid vehicle, and setting a ready-to-run state based on a predetermined pressure of the hydraulic type friction engagement device;

determining whether the hybrid vehicle is in a motor run region or a non-motor run region; and setting an original pressure of the hydraulic type friction engagement device at a first predetermined pressure as the engine is started up, and setting the original pressure at a second predetermined pressure after the engine undergoes a complete explosion, if it is determined that the hybrid vehicle is in the non-motor run region.

9. The control method of the hybrid vehicle according to claim 8, wherein the first predetermined pressure is a non-working pressure at which a hydraulic switch that detects an oil pressure of the hydraulic type friction engagement device does not operate, and the second predetermined pressure is a working pressure at which the hydraulic switch operates.

10. The control method of the hybrid vehicle according to claim 9, further comprising determining that the hybrid vehicle is in the non-motor run region on a ground that a temperature of the working oil supplied to the hydraulic type friction engagement device is below a pre-set criterion value.

11. The control method of the hybrid vehicle according to claim 9, further comprising determining that the hybrid vehicle is in the non-motor run region on a ground that a stored electricity amount of the electricity storage device is below a predetermined value.

12. The control method of the hybrid vehicle according to claim 9, further comprising:

activating, in response to the activating operation, an electric hydraulic pump that is connected to a hydraulic pump in parallel and that feeds the working pressure, and setting the original pressure of the hydraulic type friction engagement device at the working pressure;

stopping, in response to an operation of the hydraulic switch, operation of the electric hydraulic pump, and starting up the engine, and setting the original pressure of the hydraulic type friction engagement device at the non-working pressure, if the hybrid vehicle is in the non-motor run region; and setting the original pressure of the hydraulic type friction engagement device at the working pressure after a predetermined time after the non-working pressure is set, and then setting the ready-to-run state based on the operation of the hydraulic switch.

13. The control method of the hybrid vehicle according to claim 12, further comprising:

forming an overlap period during which the operation of the electric hydraulic pump and the operation of the engine overlap; and stopping the operation of the electric hydraulic pump after the overlap period.

* * * * *